US012694569B2

(12) United States Patent
Danielsson et al.

(10) Patent No.: US 12,694,569 B2
(45) Date of Patent: Jul. 28, 2026

(54) METHOD, SYSTEM AND SOFTWARE FOR SEARCHING FOR AN OBJECT IN A FORENSIC SEARCH APPLICATION

(71) Applicant: Axis AB, Lund (SE)

(72) Inventors: Niclas Danielsson, Lund (SE); Felix Lundström, Lund (SE); Johan Modin, Lund (SE)

(73) Assignee: Axis AB, Lund (SE)

( * ) Notice: Subject to any disclaimer, the term of this patent is extended or adjusted under 35 U.S.C. 154(b) by 202 days.

(21) Appl. No.: 18/656,981

(22) Filed: May 7, 2024

(65) Prior Publication Data

US 2024/0386611 A1      Nov. 21, 2024

(30) Foreign Application Priority Data

May 17, 2023    (EP) ..................................... 23173864

(51) Int. Cl.
*G06T 7/90*          (2017.01)
*G06T 7/20*          (2017.01)
(Continued)

(52) U.S. Cl.
CPC ................. *G06T 7/90* (2017.01); *G06T 7/20* (2013.01); *G06V 10/56* (2022.01); *G06V 10/60* (2022.01);
(Continued)

(58) Field of Classification Search
CPC ... G06T 7/90; G06T 2207/10024; G06T 1/00; G06T 7/00; G06T 15/506;
(Continued)

(56) References Cited

U.S. PATENT DOCUMENTS

2011/0158527 A1    6/2011  Wu et al.
2012/0170838 A1*   7/2012  Wang ..................... G06V 20/52
                                                382/165
(Continued)

OTHER PUBLICATIONS

P. Malik and K. Karthik, "Detection of purple fringing aberration patterns and its application to forensic analysis of spliced images," 2015 International Conference on Advances in Computing, Communications and Informatics (ICACCI), Kochi, India, 2015, pp. 1421-1427, doi: 10.1109/ICACCI.2015.7275812. (Year: 2015).*

(Continued)

*Primary Examiner* — Courtney Joan Nelson
*Assistant Examiner* — Courtney J Windsor
(74) *Attorney, Agent, or Firm* — Volpe Koenig

(57) ABSTRACT

A method, system and software for searching for an object in a forensic search application comprises: determining a plurality of static areas in the scene; obtaining a first image depicting the scene comprising an object; determining a plurality of candidate color transforms; determining a plurality of candidate color values of the object by applying each of the plurality of candidate color transform to third pixel data from the first image, said third pixel data depicting the object in the first image; searching for an object in a forensic search application using a search request comprising a first color value; determining that the first color value matches one or more candidate color values; and returning a search response based at least in part on the object.

15 Claims, 3 Drawing Sheets

(51) Int. Cl.
  *G06V 10/56* (2022.01)
  *G06V 10/60* (2022.01)
  *G06V 10/74* (2022.01)
  *G06V 10/762* (2022.01)

(52) U.S. Cl.
  CPC .......... *G06V 10/761* (2022.01); *G06V 10/762* (2022.01); *G06T 2207/10024* (2013.01)

(58) Field of Classification Search
  CPC ... G06T 2219/2012; G06T 11/10; G06T 7/20; H04N 9/73; H04N 9/12; H04N 9/3182; H04N 23/88; H04N 9/64; G06V 10/56; G06V 10/25; G06V 40/172; G06V 10/60; G06V 10/761; G06V 10/764; G06V 10/762
  See application file for complete search history.

(56) References Cited

U.S. PATENT DOCUMENTS

| | | |
|---|---|---|
| 2012/0274805 A1 | 11/2012 | Brown et al. |
| 2019/0114752 A1 | 4/2019 | Fors et al. |

OTHER PUBLICATIONS

Novelty Search Uppdragshuset (2022).
Extended European Search Report issued on Nov. 10, 2023 for European Patent Application No. 23173864.2.

* cited by examiner

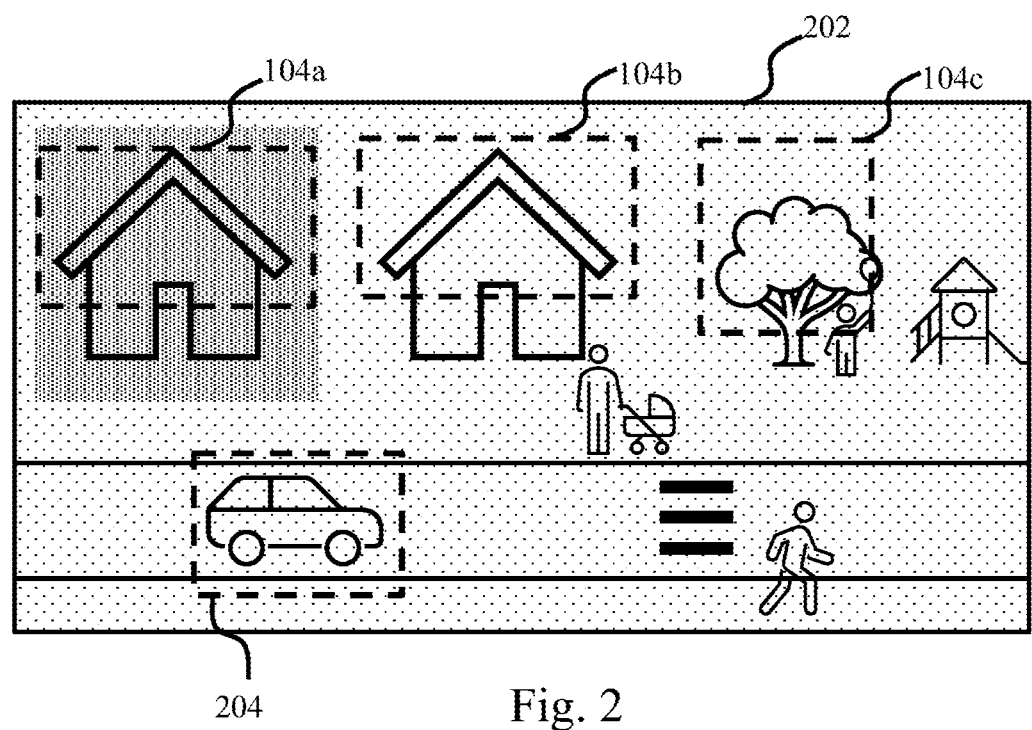
Fig. 2
| COLOR | TRANSFORM | TRANS. COLOR | CONF. |
|---|---|---|---|
| R1,G1,B1 | $F_1(R,G,B)$ | R2,G2,B2 | X1 |
| R1,G1,B1 | $F_2(R,G,B)$ | R3,G3,B3 | X2 |
Fig. 3
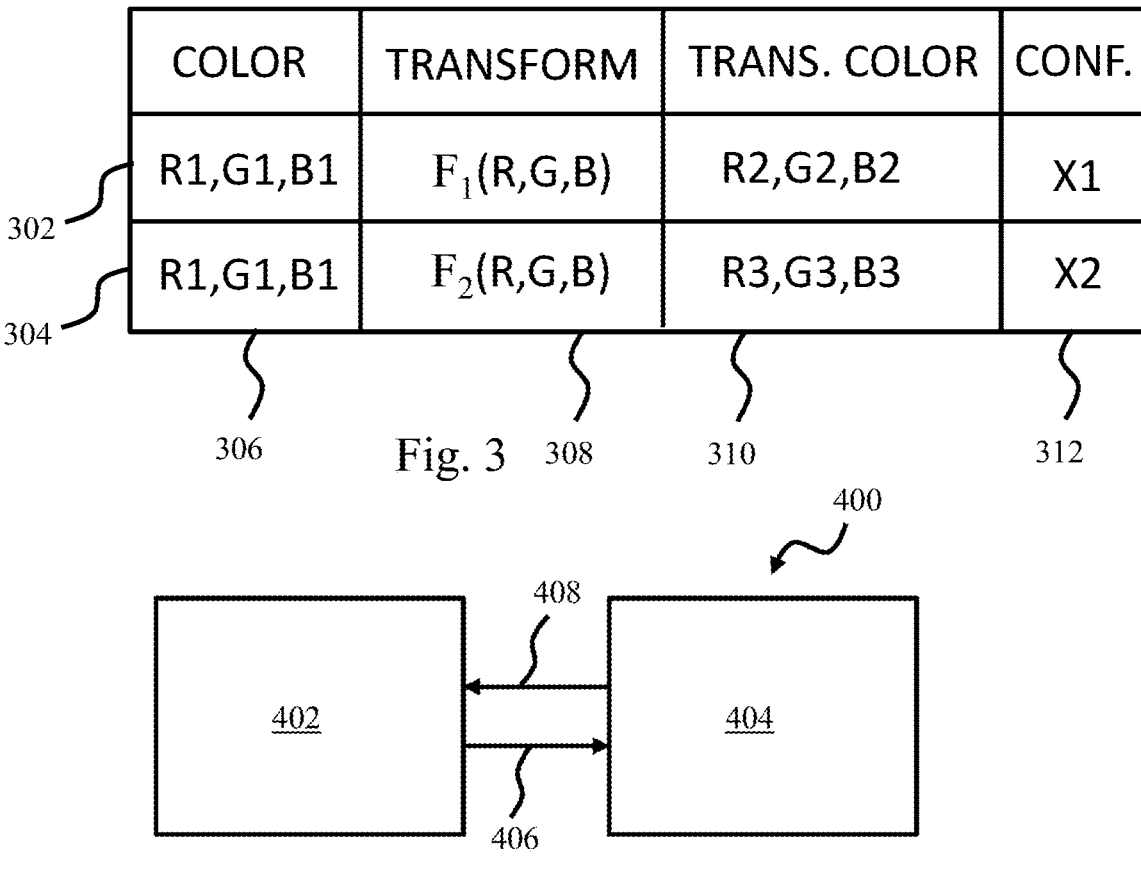
Fig. 4

METHOD, SYSTEM AND SOFTWARE FOR SEARCHING FOR AN OBJECT IN A FORENSIC SEARCH APPLICATION

FIELD OF INVENTION

The present disclosure relates to forensic search applications and in particular to using a forensic search application to search for an object in an image based on a color of the object.

TECHNICAL BACKGROUND

Color constancy is a property of the human visual system that allows humans to perceive the colors of objects as being consistent, even when the lighting conditions change. It is also a technique used in image processing to adjust the colors of an image so that they appear consistent, regardless of the lighting conditions under which the image was captured. Such a technique may also be referred to as color matching or color correction, which is the process of adjusting the colors of an image or video to match a specific reference image or color palette. This is often used in situations where color constancy is important.

An application where color constancy is of importance is forensic search applications. A forensic search application is a software tool used in digital forensics to search and analyse digital evidence. These tools can be used to search for specific objects or patterns in video files, such as a person's face, a specific car, or a specific type of weapon. Some forensic search applications have advanced features such as object detection, facial recognition, and license plate recognition which allow investigators to search for specific individuals, vehicles, or other objects in the footage, and to extract frames or clips that contain those objects. An important feature when searching for an object in images is the color of the object. However, the apparent color of an object will be influenced by surrounding light sources, such as natural light sources and artificial light sources, which may result in a faulty impression of the color of the object in the image. An example of this is a white car under a yellow streetlight, which may result in that the color of the car in an image capturing that scene is yellow rather than white.

A further problem is that lighting conditions in a scene vary based on many different reasons, such as placement of active artificial light sources, time of day, time of year, whether conditions, buildings, vegetation, etc. This makes it difficult to accurately determine an actual or natural color of an object captured in an image which in turn may negatively influence the possibility to search for an object in a forensic search application based on color of the object.

There is thus a need for improvements in this context.

US 2019/114752 (AXIS AB) relates to a method of reducing purple fringing in images captured by a camera.

SUMMARY

In view of the above, solving or at least reducing one or several of the drawbacks discussed above would be beneficial, as set forth in the attached independent patent claims. The disclosure is set out in the appended claims.

According to a first aspect of the present disclosure, there is provided a method for searching for an object in a forensic search application, the method comprising the steps of: from a plurality of images depicting a scene, determining a plurality of static areas in the scene, wherein each static area of the plurality of static areas is associated with an image from the plurality of images (also referred to as reference image); and obtaining a first image depicting the scene comprising an object.

A plurality of candidate color transforms may be determined by, for each static area of at least some of the plurality of static areas, determining a color transform based on a comparison between first pixel data from the associated image and second pixel data from the first image, said first pixel data depicting the static area in the associated image, and said second pixel data depicting the static area in the first image.

A plurality of candidate color values of the object may be determined by applying each of the plurality of candidate color transform to third pixel data from the first image, said third pixel data depicting the object in the first image. The plurality of candidate color values may then be associated to the object.

Advantageously, a forensic search application may then be used for searching for an object, wherein a search request comprising a first color value. The first color value can be compared to the plurality of candidate color values associated with object and if it is determined that the first color value matches one or more candidate color values of the plurality of candidate color values associated with the object, a search response may be returned based at least in part on the object.

The inventors have realized that due to varying lighting conditions of a scene, e.g., due to placement of active artificial light sources, time of day, time of year, whether conditions, buildings, vegetation, etc., it may be difficult to determine a single color transform for the first image that will accurately determine an actual or natural color of an object captured in the first image. Additionally, determining a single color transform for the object in the first image may be difficult since objects located farther away in the scene can be affected by different lighting than closer objects, however the depth dimension is not captured in the image.

Instead, a plurality of candidate color transforms may be determined for different areas of the scene depicted in the first image, and the object may be associated with colors based on each of the candidate color transforms. Advantageously, the risk of false negatives when searching for an object having a specific color in a forensic search application may be reduced.

The candidate color transforms are based on the determined color transforms and may in examples include all determined color transforms, a subset of the determined color transforms, aggregate versions of the determined color transforms, etc.

The candidate color values may be one per candidate color transform, in case the object has a single color in the first image, or several color values per candidate color transform in case the object has several colors in the first image. Advantageously, a flexible method is provided, which may reduce the risk of false negative irrespectively of the color composition of the object in the first image.

A candidate color transform for a specific area of the scene (i.e., a static area) may be determined using histogram matching. This algorithm may calculate a color transform for adjusting the color distribution of the static area in the first image to match the color distribution of the static area of the image associated with the static area (e.g., the reference image for the static area). In some embodiments, only a subset of pixel data depicting the static area from the first image and the reference image is used to determine the candidate color transform, for example pixel data depicting a clearly identifiable object in the static area which exist in both the first image and the reference image. Other suitable methods for determine the candidate color transform may be used such as color consistency algorithms.

By the term "static areas in the scene" should, in the context of present specification, be understood an area of the scene in which motion or movement during a time period does not exceeds a threshold. For example, in case detected motion in an area of the scene is lower than a threshold over the plurality of images, the area may be determined to be static. This technique may also be referred to as optical flow estimation. Other example techniques include comparing the pixel values in corresponding locations across the images, and deep learning based methods, such as convolutional neural networks (CNN) or recurrent neural networks (RNN), which can be trained to identify static areas of a scene by analysing the images.

The details of the actual search response may be based on the requirements of the forensic search application. For example, a search response may include the first image (where the object having a candidate color value matching the color value of the search request where found), or a time span of a video stream where the object is detected, or a time stamp where the object is detected, a license plate of the object, a face of the object, etc.

In some examples, the step of determining a plurality of candidate color transforms comprises clustering the determined color transforms into a plurality of clusters, determining a representative color transform for each cluster and using the representative color transform as a candidate color transforms. The representative color transform may for example be the color transform at the centre of the cluster, or an average color transform of the cluster. Advantageously, the number of candidate color transforms may be reduced by grouping similar color transforms together, using any suitable clustering algorithm such as K-means or Hierarchical Agglomerative Clustering (HAC). Consequently, a more efficient method may be achieved.

In some examples, the step of determining a plurality of candidate color transforms comprises determining a plurality of representative color transforms from the determined color transforms using a Random Sample Consensus, RANSAC, algorithm and using the plurality of representative color transform as the plurality of candidate color transforms. Using RANSAC may be more robust against outliers among the determined color transforms.

In some embodiments, the method further comprises for each candidate color value among the plurality of candidate color values, determining a confidence score indicating a probability that the candidate color value equals a color of the object in the scene as observed in natural daylight, wherein the confidence score is based at least in part on at least one of:

a spatial distance from the object in the scene to a static area among the plurality of static areas in the scene, wherein said static area being involved when determining the candidate color value, wherein a comparably shorter distance results in a comparably higher confidence score, a comparison of a distance between the object in the scene to a camera capturing the first image and a distance between a static area among the plurality of static areas in the scene and the camera, wherein said static area being involved when determining the candidate color value, wherein a comparably similar distance results in a comparably higher confidence score, clustering the plurality of candidate color values, wherein the candidate color value being part of a comparably larger cluster results in a comparably higher confidence score.

As described above, it may be difficult to, based on image data alone, determine a color transform that will transform a color of an object in an image to a color as it would be perceived by a human watching the scene (e.g., mimicking color consistency). Different metrics may be applied to assess a probability that a certain candidate color is the correct one of an object, e.g., as it would be perceived in natural daylight. For example, a spatial distance between the object to the static area involved (e.g., directly causing a candidate color transform or being part of an aggregated candidate color transform through clustering, RANSAC or any other aggregation method) when determining the color value be used, such that a closer distance result in a higher confidence. In other example, comparison between depth in the scene (based on the location of the camera capturing the scene) may be used such that similar depths results in a higher confidence. In yet other examples, a more probable candidate color is candidate color that is similar to other candidate colors, which may be determined using a suitable clustering algorithm.

In some examples, the step of determining a plurality of candidate color transforms further comprises receiving motion data indicating detected motion in each of the plurality of static areas in the scene as depicted in the first image, and upon the detected motion exceeding a threshold motion value for a static area of the plurality of static areas, disregarding said static area when determining the plurality of candidate color transforms. Advantageously, areas in the first image which for some reason includes motion (e.g., exceeding a threshold motion value) are disregarded when determining a candidate color transforms. This may reduce the risk of faulty candidate color transforms due to that the image data depicting a determined static area in the first image is not comparable (due to motion) to image data from the image associated with the static area.

In some embodiments, the step of determining a plurality of static areas in the scene comprises at least one of:

for each image of the plurality of images, determining a luminosity value of natural light in the scene as depicted by the image, and associating each of the static areas with the image having the highest luminosity value; and for each image of the plurality of images, determining a Color Rendering Index, CRI, of light in the scene as depicted by the image, and associating each of the static areas with the image having the highest CRI.

To determine which image among the plurality of images that "most naturally" represent the plurality of static areas, one approach is to determine a luminosity value of natural light in the scene (e.g., using average saturation value of the image or using machine learning based methods, such as deep learning, which can be trained to recognize the natural light in images by analysing the colors and textures of the image). The image having the highest determined luminosity value may then be associated with each of the determined static areas. Additionally, or alternatively, CRI may be used to identify the most suitable reference image for the plurality of static regions.

In some embodiments, the representative image may vary between static areas. This may further improve the correctness of the candidate color values since local variations of lighting conditions in the scene may advantageously be considered when determining a representative image for a particular static area of the scene. This may be achieved by for each static area of the plurality of static areas in the scene, performing at least one of:

for each image of the plurality of images, determining a luminosity value of natural light in the static area in the scene as depicted by the image, and associating the static area with the image of the plurality of images having the highest determined luminosity value for the static area; and for each image of the plurality of images, determining a Color Rendering Index, CRI, of light in the static area in the scene as depicted by the image, and associating the static area with the image of the plurality of images having the highest CRI for the static area.

In some embodiments, the step of determining a plurality of static areas in the scene comprises: receiving motion data indicated detected motion in each image of the plurality of images and determining the plurality of static areas in the scene based on the received motion data. Advantageously, a low complexity way of determining static areas of the scene may be achieved. For example, motion data already available from an upstream component may be used.

In some embodiments, the step of determining a plurality of static areas in the scene comprises, for each area of a plurality of areas in the scene, determining a similarity measure between image data depicting the area in the plurality of images, upon the similarity measure exceeding a threshold similarity measure, including the area among the plurality of static areas. For example, based on a predefined division of the scene into areas (e.g., based on a size of pixel data of depicting the area, such as 50*50 pixels, or 75*75 pixels, etc., or based on segmentation of the scene into areas), a similarity measure between pixel data among the plurality of images may be determined. Put differently, for an area of the scene, image data of each of the plurality of images is compared with the corresponding image data in each of the other images among the plurality of image and a similarity is determined. The similarity measure may be calculated bases on e.g., feature-based image comparison (extracting distinctive features from the images, such as corners or edges, and then comparing the features to determine the similarity between the images), feature-less image comparison (direct comparison of the pixel values of the pixel data of two images), using the Structural Similarity (SSIM) index or deep learning-based methods. The similarity measure may for example correspond to an average difference or median difference among the plurality of images, possibly removing outliers before calculating the average difference.

In some examples, the step of determining a plurality of static areas in the scene is performed repeatably with a regular interval, each time using a new set of images. Advantageously, changes in the scene, such as a static area changing to a non-static area due to structural changes in the scene, may be handled. Moreover, changes of lighting conditions in the scene may be handled such that a reference image associated with a static area is updated to mitigate the changes in lighting conditions.

According to a second aspect of the disclosure, the above object is achieved by a non-transitory computer-readable storage medium having stored thereon instructions for implementing the method according to the first aspect when executed on a device having processing capabilities.

According to a third aspect of the disclosure, the above object is achieved by a system comprising a color matching component and a forensic search application, wherein the color matching component comprises: one or more processors; and one or more non-transitory computer-readable media storing first computer executable instructions that, when executed by the one or more processors, cause the color matching component to perform actions comprising: from a plurality of images depicting a scene, determining a plurality of static areas in the scene, wherein each static area of the plurality of static areas is associated with an image from the plurality of images; obtaining a first image depicting the scene comprising an object; determining a plurality of candidate color transforms by, for each static area of at least some of the plurality of static areas, determining a color transform based on a comparison between first pixel data from the associated image and second pixel data from the first image, said first pixel data depicting the static area in the associated image, and said second pixel data depicting the static area in the first image; determining a plurality of candidate color values of the object by applying each of the plurality of candidate color transform to third pixel data from the first image, said third pixel data depicting the object in the first image; associating the plurality of candidate color values to the object; receiving a search request comprising a first color value; determining that the first color value matches one or more of the plurality of candidate color values associated with the object; and returning a search response based at least in part on the object.

The forensic search application of the system comprises: one or more processors; and one or more non-transitory computer-readable media storing second computer executable instructions that, when executed by the one or more processors, cause the forensic search application to perform actions comprising: providing a search request comprising a first color value to the color matching component; receiving a search response from the color matching component; and displaying data from the search response to a user.

In some examples, the first computer executable instructions further cause the color matching component to perform actions comprising: for each candidate color value among the plurality of candidate color values, determining a confidence score indicating a probability that the candidate color value equals a color of the object in the scene as observed in natural daylight, wherein the confidence score is based at least in part on at least one of:

a spatial distance from the object in the scene to a static area among the plurality of static areas in the scene, wherein said static area being involved when determining the candidate color value, wherein a comparably shorter distance results in a comparably higher confidence score, a comparison of a distance between the object in the scene to a camera capturing the first image and a distance between a static area among the plurality of static areas in the scene and the camera, wherein said static area being involved when determining the candidate color value, wherein a comparably similar distance results in a comparably higher confidence score, and clustering the plurality of candidate color values, wherein the candidate color value being part of a comparably larger cluster results in a comparably higher confidence score;

The search response may then comprise the confidence score determined for the candidate color value matching the first color value of the search request. In some embodiments, the forensic search algorithm displays the confidence score of e.g. a object included in the search respond. In other examples, the forensic search algorithm filters the search responses such that only search responses with a confidence score exceeding a threshold confidence are displayed.

In some embodiments, the first computer executable instructions further cause the color matching component to perform actions comprising: receiving motion data indicated detected motion in each of the plurality of static areas in the scene as depicted in the first image, and upon the detected motion exceeding a threshold motion value for a static area of the plurality of static areas, disregarding said static area when determining the plurality of candidate color transforms.

In some embodiments, the first computer executable instructions further cause the color matching component to perform actions comprising at least one of:

clustering the determined color transforms into a plurality of clusters, determining a representative color transform for each cluster and using the representative color transform as a candidate color transforms, and determining a plurality of representative color transforms from the determined color transforms using a Random Sample Consensus, RANSAC, algorithm and using the plurality of representative color transform as the plurality of candidate color transforms.

The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features, and advantages of the present disclosure, will be better understood through the following illustrative and non-limiting detailed description of embodiments of the present disclosure, with reference to the appended drawings, where the same reference numerals will be used for similar elements, wherein:

FIG. 2 shows an image comprising an object for which a plurality of candidate color values are determined according to embodiments, FIG. 3 shows data used when searching for an object in a forensic search application according to embodiments, FIG. 4 shows a system comprising a color matching component and a forensic search application according to embodiments.

DETAILED DESCRIPTION

A color of an object in an image may be determined by the material and surface properties of the object, which determine the amount of light absorbed and reflected by the object and therefore its perceived color. The color of the object in the image may further be influenced by the camera settings (white balance, color profile, etc.) and image post processing. These properties may typically be controllable by the owner of the camera. Properties that may be difficult to control is light sources and lighting conditions when capturing the image or video, in particular in a monitoring situation where the camera is continuously capturing a scene. Light sources and lighting conditions may have a big influence on the color of an object in the image of a scene, which in turn means that the color may be perceived differently depending on time of day, time of year, weather conditions etc. This may cause problems when searching for an object, e.g., in a forensic search application, based on a color of the object. For example, a user searches for a white vehicle, and thus input "white" as the color of the object. The forensic search application may then filter on all white vehicles in a video, which may lead to that a white car under a yellow streetlight may be missed since its image data indicates a yellow vehicle.

The present disclosure aims to provide methods, systems, and software's for searching for an object in a forensic search application which take into account that light sources and lighting conditions may vary in a scene. For example, a yellow streetlight may only light up a part of a scene, while another part of the scene is darker due to vegetation. Moreover, depth may vary over the scene, i.e., different part of the scene may be located on different distances from the camera capturing the scene, which may influence a color of an object is perceived depending on where in the scene it is located. An object's color in an image can depend on the depth in the scene of that object. This is because of a phenomenon called "atmospheric perspective," which is also known as "aerial perspective" or "haze." Atmospheric perspective refers to the way that the appearance of objects changes as they recede into the distance, due to the scattering of light in the atmosphere. As objects get farther away, they may appear less sharp and less distinct, and their colors may become less saturated and shift towards cooler hues. In addition, objects located at different distances from the camera, i.e. at different depths in the scene, may be affected by different lighting. The depth dimension is not captured in an image depicting the scene. Hence, two objects appearing at about the same place in an image may be at different depth and need different transformations.

Figure 1:
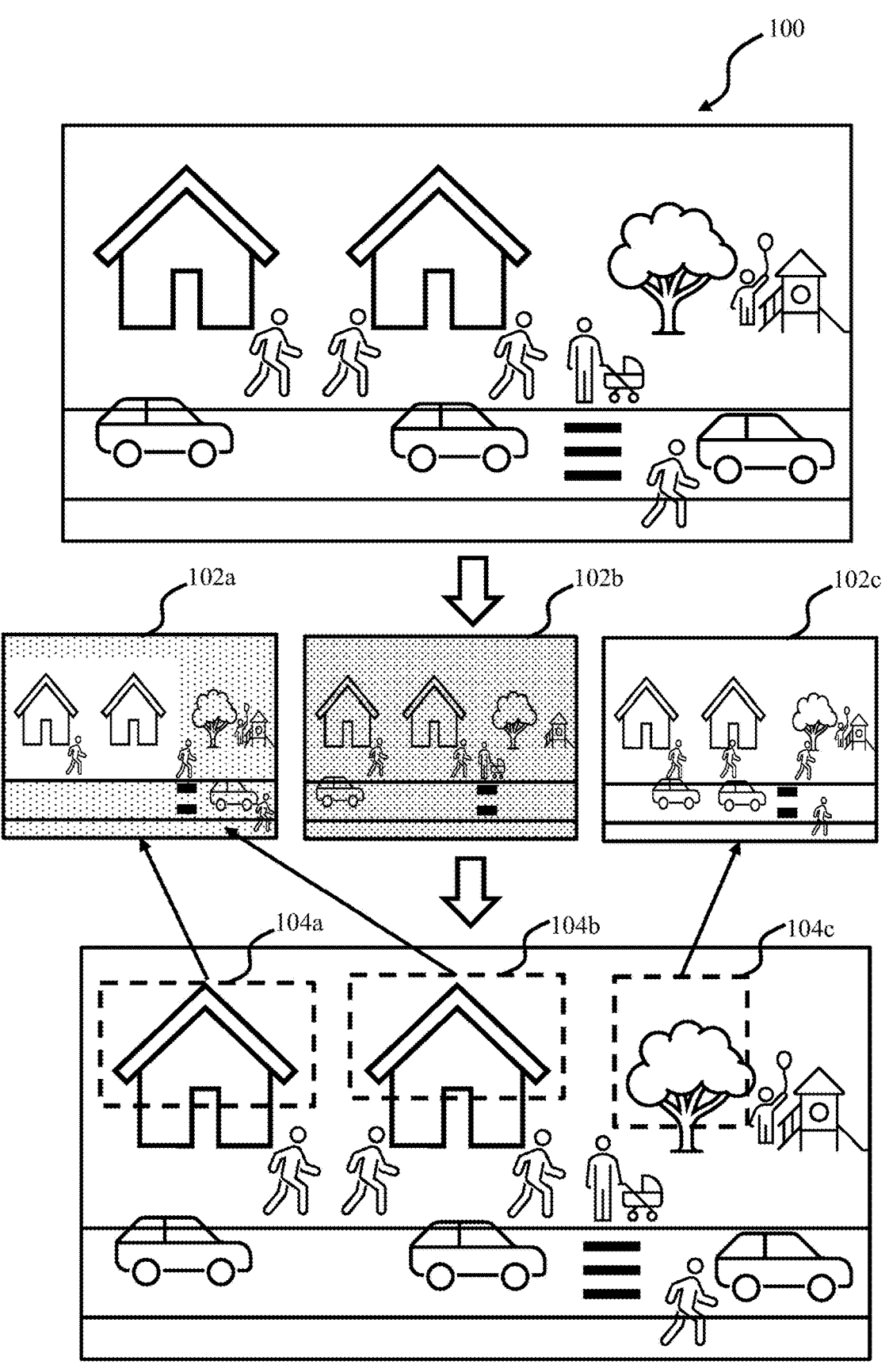
FIG. 1 shows a scene for which a plurality of static areas are determined according to embodiments.

FIG. 1 schematically describes, by way of example, how a plurality of static areas may be determined in a scene using a plurality of images 102a-c. In FIG. 1, a scene 100 is captured. In the example of FIG. 1, the scene 100 comprises a road with vehicles, pedestrians walking by the road, some buildings and vegetation and a playground. The scene 100 is captured in the plurality of images 102a-c. The plurality of image may represent the scene at various point in times, for example one image per hour (or every other hour, every third hour, etc.) during a 24-hour period. Advantageously, this embodiment captures both varying lighting conditions during 24 hours as well as varying behaviour of objects of the scene during such time span. In other embodiments, the plurality of images 102a-c are captured during other time spans and with other time differences between each image. For example, the plurality of image may comprise fewer images captured during night-time compared during daytime since lighting conditions and behaviour may differ more during daytime.

The plurality of images 102a-c may be analysed to determine areas 104a-c in the scene 100 where little movements occur over the plurality of images 102a-c, or where small differences in image data between the images 102a-c are detected. Such areas are referred to as static areas in this disclosure. In examples, motion data indicating detected motion in each image 102a,b,c of the plurality of images 102a-c is received, for example from a motion detection component which is configured to detect motion in a video stream. Motion detection may be performed using any suitable algorithm (e.g., Background subtraction, Optical flow, Frame difference, Feature tracking, etc.). The plurality of static areas 104a-c in the scene may thus be determined based on the received motion data. For example, in case an average motion in an area in the scene 100 is below a threshold motion, the area may be determined to be a static area 104a-c. In other examples, in case the motion detected in an area of the scene is lower than a threshold motion in at least a threshold number of images 102a-c (for example 50%, 75%, etc., of the images), the area may be determined to be a static area 104a-c.

In other examples, the plurality of static areas 104a-c may be determined by, for each area of a plurality of areas in the scene, determining a similarity measure between image data depicting the area in the plurality of images, upon the similarity measure exceeding a threshold similarity measure, including the area among the plurality of static areas. The similarity measure may be based on a pixel-by-pixel comparison (such as mean square error or normalized cross-correlation) between each of plurality of images 102a-c, to determine static areas 104a-c. Any other similarity metric may be employed, such as structural similarity index or feature matching. Moreover, the concept of static areas may be used also where motion is detected. For example, foreground subtraction methods (e.g., using Gaussian Mixture Models to define the background model) may be used to remove the moving object. The remaining image data may be used as a static area.

When the plurality of static areas 104a-c in the scene have been determined, each static area may be associated with an image 102a,b,c among the plurality of images 102a-c. As mentioned above, lighting conditions and light sources may vary over a scene 100. In some embodiments, each static area 104a-c may be associated with a same image 102a,b,c among the plurality of images 102a-c. In examples, the image to be associated with a static area 104a-c is determined by determining which of the images 102a-c that has most natural light and associating each of the static areas 104a-c with this image. The natural light can be approximated by determining a luminosity value of the full scene (e.g., converting the image to LAB color space and average or summarize the L-value for all pixels, or doing the same for the V-value of the pixels in an image in the HSV color space). The natural light may in examples be determined using a machine learning system trained to assess an amount of natural light in an image, where such machine learning system have been trained on labelled training data (images). Any other suitable algorithm for assessing the amount of natural light in an image may be used. In some embodiments, a Color Rendering Index (CRI) is determined for the image and the image having the highest CRI may be associated with each static area 104a-c. The CRI may be determined for example using one or more spectrometers in the scene which measures the spectral power distribution of the light sources illuminating the scene and compare the measurements to measurements of values produced by a standard or desired illuminant (such as sunlight at noon). CRI may be approximated by determining the luminosity value as exemplified above or by determining a saturation value for the image. In some embodiments, the position of the sun may be determined from the image (or by using a time stamp of the image) and the position may be used to assess the amount of natural light in the image.

In other embodiments, one static area may be associated with one image whereas another static area is associated with a different image. In the example of FIG. 1, the leftmost image 102a among the plurality of images 102a-c is well-lit at the portion of the scene 100 corresponding to two of the determined static areas 104a-b, but darker at the portion of the scene 100 corresponding to the third 104c of the determined static areas. The middle image 102b is dark over the whole image while the right most image 102c is light over the whole image. In the example of FIG. 1, two static areas 104a-b are associated with the leftmost image 102a while the third static area 104c is associated with the right most image 102c. The same strategy used above for determining which image that has most natural light may thus be used but employed for each static area 104a-c instead. Consequently, in examples, the image to be associated with a static area 104a-c is determined by determining which of the images 102a-c that has most natural light in that static area. CRI may be used as a measurement as discussed above.

It should be noted that the plurality of static areas in the scene 100 may be determined at regular intervals, such as once per day, once per week, once per month, etc, each time using a recently captured set of images. Consequently, the static areas in the scene 100 may be updated in view of e.g., changes in the scene such as new buildings, constructions sites, road works, etc., changes in behaviours of moving objects in the scene (pedestrians, vehicles, etc.), and changes in lighting conditions and light sources.

FIGS. 2-3 show usage of the static areas 104 and associated images as determined in FIG. 1. In FIG. 2, a new image 202 (hereinafter referred to as a "first image") has been captured of the scene 100. The first image 202 comprises an object 204. In this example, the object 204 is a vehicle. The lighting conditions of the first image is a bit dark and in particular one of the buildings (the left one) is darker than the rest of the image 202. From just analysing the color of the vehicle 204 it may be difficult the determine the "true" color (i.e., the normalized color) of the vehicle 204 since this depends on the lighting conditions as discussed above.

Using the determined static areas 104a-c, a plurality of candidate color transforms may be determined. A color transform for a static area 104a may be determined by comparing first pixel data from the image 102a associated with the static area 104a with second pixel data from the first image 202. The first pixel data depicts the static area 104a in the associated image 102a, and the second pixel data depicts the static area 104a in the first image 202. The specific steps and the mathematical formula used to create the transform matrix will depend on the color space and the representation used.

In a simplistic example, for a RGB image, the following steps may be used:

1) for both the first image 202 and the associated image 102a, determine the average RGB values for a set of pixels within the static area, call the values for the associated image (R_target, G_target, B_target) and for the first image (R_avg, G_avg, B_avg)

2) Calculate the delta values for each channel by subtracting the average values from the target values:

$$\Delta R = \text{R\_target} - \text{R\_avg}, \quad \Delta G = \text{G\_target} - \text{G\_avg}, \qquad \text{Equation 1}$$
$$\Delta B = \text{B\_target} - \text{B\_avg}$$

3) Create a transform matrix that incorporates the delta values $$[1, 0, 0, \Delta R], \quad [0, 1, 0, \Delta G], \quad [0, 0, 1, \Delta B], \quad [0, 0, 0, 1] \qquad \text{Equation 2}$$

In another example, a color correction matrix (CCM) may be computed and used as the color transform, e.g. as described at https://github.com/lighttransport/colorcorrectionmatrix at the time of filing this patent application. In summary, the CCM may be computed using the following steps:

1) Determine (manually or using heuristics) X number of first image points from the first pixel data and the corresponding second image points from the second pixel data. X may in some examples be 24, but any suitable number of image points may be used.

2) The color correction matrix is computed using the point pairs. This is done by solving the equation $$source\_xyz * CCM == reference\_xyz \qquad \text{Equation 3}$$

for the CCM, where source_xyz are the first image points, reference_xyz are the second image points, and CCM is the color correction matrix. The color correction matrix (CCM) may be 3×3 matrix, but may be represented as a 4×3 matrix, with an additional row of ones appended to the target points to account for a translation component in the transformation. However, this extra row is not part of the CCM itself, and can be removed to obtain the 3×3 CCM.

3) Use the CCM transform as a candidate color transform. The actual conversion may be done via an intermediate representation called Tristimulus. Tristimulus values measure light intensity based on the three primary color values (RGB), typically represented by X, Y, and Z coordinates. In the XYZ color space, Y corresponds to relative luminance; Y also carries color information related to the eye's "M" (yellow-green) cone response. X and Z carry additional information about how the cones in the human eye respond to light waves of varying frequencies.

A candidate color transform may be determined for each static area 104a-c. In some embodiments, motion detection may be applied to the first image to identify if any of the static areas 104a-c in fact is not static in the first image 202. For example, motion data may be received (or determined) indicating detected motion in each of the plurality of static areas 104a-c in the scene 100 as depicted in the first image 202. Upon the detected motion exceeding a threshold motion value for a static area of the plurality of static areas 104a-c, this static area may be disregarded when determining the plurality of candidate color transforms. Areas in the first image in which motion is detected may thus be avoided when determining the candidate color transforms since motion indicates that the area is not static and that a determined candidate color transform may not correctly reflect differences in lighting conditions between the first image 202 and the image associated with the static area. In FIG. 2, the right most static area 104c comprises a playing child, and this static area 104c may thus be disregarded.

For the example in FIG. 2, only two candidate color transforms are finally determined. However, in many cases the number of static areas is bigger, for example 10, 14, 26, etc. In some embodiments, one transform per pixel in a static area may be determined. For efficiency, it may be valuable to reduce the number of candidate color transforms. In examples, the determined color transforms (one per static area, possibly disregarding static areas with motion), may be clustered into a plurality of clusters, wherein one representative color transform is determined for each cluster. The representative color transform for each cluster may then be used as a candidate color transform. Any suitable clustering algorithm, such as K-means, may be used as described above. In other examples, a Random Sample Consensus, RANSAC, algorithm may be used to remove outliers.

When the candidate color transforms have been determined, these may then be used to determine possible colors for the object 202. The possible colors may be referred to as "normalized colors". FIG. 3 shows the data involved according to embodiments. For example, a color 306 for the object 204 may be determined using the pixel data depicting the object 204 in the first image 202. In some cases, an average color, or a most common color, among the pixels depicting the object 202 may be used. In some cases, a plurality of colors of the object 204 is determined, e.g., in case the object 204 is multi-colored. For example, a set fraction or a set number of pixels in the pixel data of the object 204 may need to be in a certain color in order for that color to be determined for the object. In some embodiments, the object may be divided into subparts wherein one or more colors may be determined for each subpart. For example, a person may be divided into an upper part and a lower part. A first set of colors (including one or more colors) may be determined for the upper part, and a second set of colors (including one or more colors), typically different from the first set of colors, may be determined for the lower part.

Each color the object 204 is determined to have may then be transformed into a candidate color value 310 using the transform 308 determined for the static area 104a-b in question. In the example of FIG. 3, two transforms 308 were determined for the first image 202 in FIG. 2. Each transform 308 result in a separate row 302, 304 in the data matrix of FIG. 3, one per static area 104a-b used for the case described in FIG. 2. The determined color 306 (only one color in this example) is thus transformed using two different transforms 308 into two different candidate colors 310. For the example of Equation 2, the transform reads:

$$R' = R + \Delta R, \quad G' = \Delta G, \quad B' = B + \Delta B \qquad \text{Equation 3}$$

In some embodiments, a confidence score 312 is determined for each candidate color value 310. The confidence score 312 may indicate a probability that the candidate color value 310 indeed is a color that the object 202 is considered to have under typical circumstances. Put differently, a confidence score 312 indicates a probability that the candidate color value equals a color of the object in the scene as observed in natural daylight. It should be noted that the confidence score is an approximation of this, and that the metrics used is intended to provide a sufficiently good indication if the transformed color is "correct" or not.

The confidence score 312 may be based on a spatial distance between the object in the scene and a static area in the scene involved when determining the candidate color value 310. In case no clustering of candidate color transforms has been employed, the static area for which the candidate color transform was determined is used as a reference point and a distance between the object and the static area is determined. In case clustering has been applied, a distance measure may correspond to an average distance, a nearest distance, or a farthest distance, etc., to static areas in the cluster. A shorter distance results in a higher confidence score 312 compared to a longer distance. The distances may for example be normalized to determine the confidence score 312 or compared to a predetermined mapping between confidence scores and distances. Any other suitable function for determining the confidence score based on distances may be applied, and the function used in the end may be based on the forensic search application, its application area and configuration.

The confidence score 312 may alternatively or additionally be based on a depth in the scene 100, such that a candidate color value 310 determined based on a static area at a similar depth in the scene compared to the object 202 gets a higher confidence compared to a candidate color value determined based on a static area with a larger difference in depth in the scene compared to the object 202. The difference in depth may for example be normalized to determine the confidence score 312 or compared to a predetermined mapping between confidence scores and differences in depth. Any other suitable function for determining the confidence score based on differences in depth may be applied, and the function used in the end may be based on the forensic search application, its application area and configuration.

The confidence score for a candidate color value 310 may alternatively or additionally be based on how similar the candidate color value 310 is to the other candidate color values 310. This may be achieved by clustering the candidate color values 310. In examples, a candidate color value 310 being part of a comparably larger cluster results in a comparably higher confidence score. The more similar a certain candidate color 310 value is compared to the other candidate color values 310, the higher confidence 312 that candidate color value 310 will get. The cluster sizes may be normalized to determine the confidence score 312, or compared to a predetermined mapping between confidence scores and cluster sizes. Any other suitable function for determining the confidence score based on cluster sizes may be applied, and the function used in the end may be based on the forensic search application, its application area and configuration.

Figure 5:
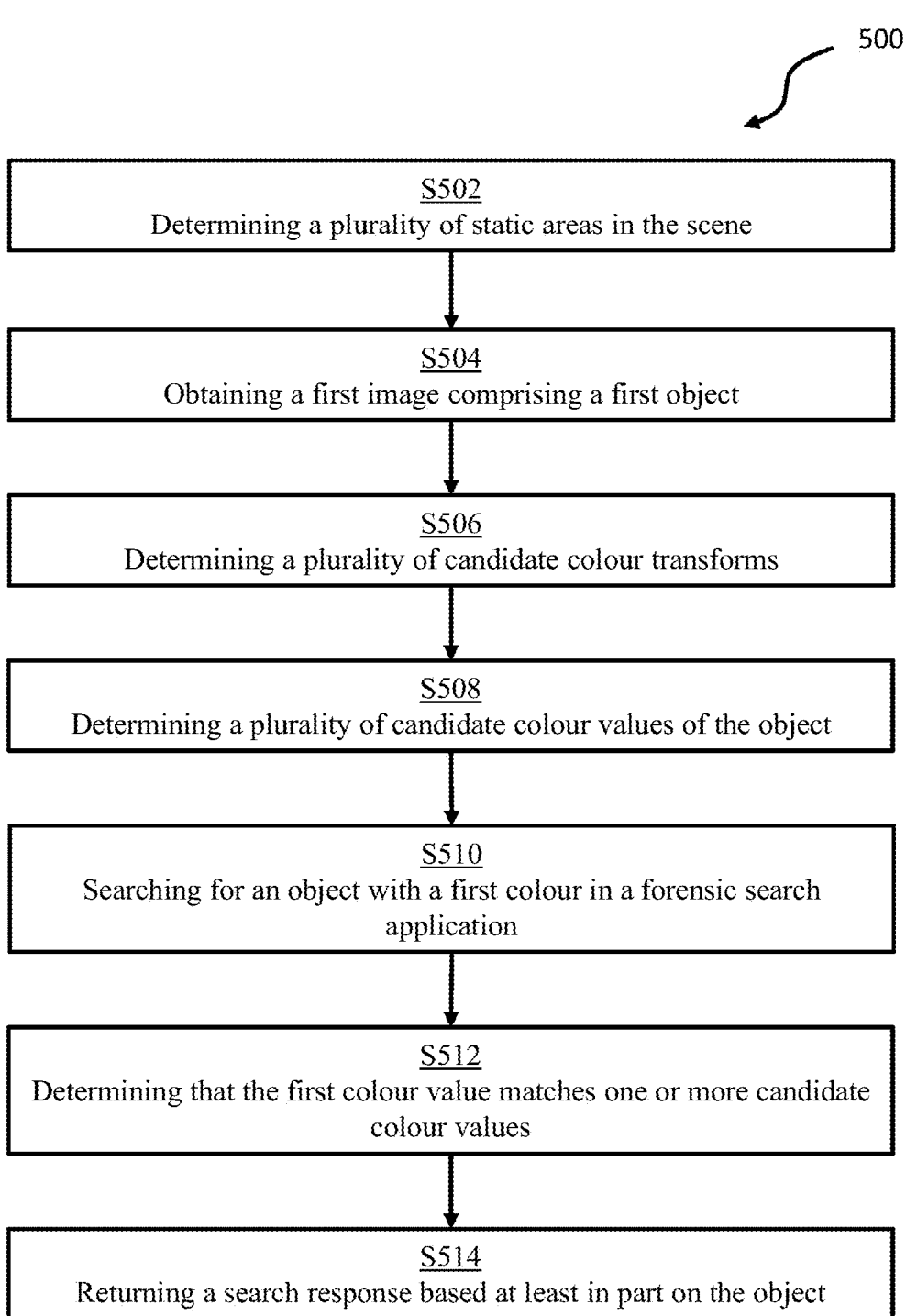
FIG. 5 shows a flow chart of a method for searching for an object in a forensic search application according to embodiments.

FIG. 4 describes a system 400 comprising a color matching component 404 and a forensic search application 402 with functionality as described above. Such a system will now be described in conjunction with FIG. 5, showing a flow chart of method 500 for searching for an object in a forensic search application.

The color matching component comprises one or more processors and one or more non-transitory computer-readable media storing first computer executable instructions that, when executed by the one or more processors, cause the color matching component to perform actions as described herein.

The first computer executable instructions cause the color matching component to perform actions comprising: from a plurality of images depicting a scene, determining S502 a plurality of static areas in the scene, wherein each static area of the plurality of static areas is associated with an image from the plurality of images; obtaining S504 a first image depicting the scene comprising an object; determining S506 a plurality of candidate color transforms by, for each static area of at least some of the plurality of static areas: determining a color transform based on a comparison between first pixel data from the associated image and second pixel data from the first image, said first pixel data depicting the static area in the associated image, and said second pixel data depicting the static area in the first image; determining S508 a plurality of candidate color values of the object by applying each of the plurality of candidate color transform to third pixel data from the first image, said third pixel data depicting the object in the first image; and associating the plurality of candidate color values to the object.

The color matching component 404 is configured to receive a search request 406 comprising a first color value, which may represent the color of the object searched for. The search request may comprise further data such as type of object and other metadata relating to the search. The search request may for example describe how the result should be provided. The search request may be provided in an encrypted format, for example encrypted using a public key from an asymmetric key pair, and the color matching component 404 may have the corresponding private key to encrypt the search request.

The color matching component 404 may then determine S512 that the first color value matches one or more of the plurality of candidate color values associated with the object, and return S514 a search response 408 based at least in part on the object. Similar to the search request 404, the search response may be encrypted.

The forensic search application 402 comprises one or more processors and one or more non-transitory computer-readable media storing second computer executable instructions that, when executed by the one or more processors, cause the forensic search application to perform actions as described herein. The forensic search application may be coupled to one or more input devices such as a keyboard or a camera (e.g., to setup a search request). The forensic search application may be coupled to an output device such as a display to display the search response to a user. The forensic search application may further be coupled to a data storage system, e.g., to log search requests and search responses, handle users etc.

The forensic search application 402 is configured to provide the search request 406 comprising the first color value to the color matching component 404. The search request may further define other criteria for the search such as further keywords, file types, object types, time periods, geographic areas, etc. The search request 406 may be encrypted as described above.

The forensic search application 402 is configured to receive the search response 408 from the color matching component 404. In case the search did not result in any hit, the search response 408 may be empty or specify that no object matched the search criteria, such as the first color value. In case the search did result in a hit, e.g., the object discussed above, the search response 408 may include information about the object, for example an image, a video, metadata about the object (size, ID, position, etc.), or any other suitable data based on the setup of the forensic search application 402 and the color matching component 404. The search response 408 may for example comprise the confidence score discussed above. The search response 408 may be encrypted as described above. Data from the search response 408 may then be displayed to a user, for example showing the first image or a portion of the first image including the object.

Suitable processors for the execution of a program of instructions (like the first and second computer executable instructions) include, by way of example, both general and special purpose microprocessors, and the sole processor or one of multiple processors or cores, of any kind of computer. The processors can be supplemented by, or incorporated in, ASICs (application-specific integrated circuits).

The above embodiments are to be understood as illustrative examples of the disclosure. Further embodiments of the disclosure are envisaged. For example, the color matching component may be coupled to an external data storage from which the plurality of images as well as the first image are retrieved.

The invention claimed is:

1. A method for searching for an object in a forensic search application, the method comprising the steps of:

from a plurality of images depicting a scene, determining a plurality of static areas in the scene, wherein each static area is associated with an image from the plurality of images;

obtaining a first image depicting the scene comprising an object;

determining a plurality of candidate color transforms by, for at least some of the plurality of static areas:

determining a color transform based on a comparison between first pixel data from the associated image and second pixel data from the first image, said first pixel data depicting the static area in the associated image, and said second pixel data depicting the static area in the first image;

determining a plurality of candidate color values of the object by applying each of the plurality of candidate color transforms to third pixel data from the first image, said third pixel data depicting the object in the first image;

associating the plurality of candidate color values to the object;

searching, in a forensic search application, using a search request comprising a first color value as a search criterion; and upon determining that the first color value matches one or more candidate color values of the plurality of candidate color values associated with the object, returning a search response including information about the object.

2. The method of claim 1, wherein the step of determining a plurality of candidate color transforms comprises:

clustering the determined color transforms into a plurality of clusters, determining a representative color transform for each cluster and using the representative color transform as a candidate color transforms.

3. The method of claim 1, wherein the step of determining a plurality of candidate color transforms comprises:

determining a plurality of representative color transforms from the determined color transforms using a Random Sample Consensus, RANSAC, algorithm and using the plurality of representative color transform as the plurality of candidate color transforms.

4. The method of claim 1, further comprising, for each candidate value, determining a confidence score indicating a probability that the candidate color value equals a color of the object in the scene as observed in natural daylight, wherein the confidence score is based at least in part on at least one of:

a spatial distance from the object in the scene to a static area, wherein said static area being involved when determining the candidate color value, wherein a comparably shorter distance results in a comparably higher confidence score, a comparison of a distance between the object in the scene to a camera capturing the first image and a distance between a static area among the plurality of static areas in the scene and the camera, wherein said static area is involved when determining the candidate color value, and a comparably similar distance results in a comparably higher confidence score, or clustering the plurality of candidate color values, wherein the candidate color value being part of a comparably larger cluster results in a comparably higher confidence score.

5. The method of claim 1, wherein the step of determining a plurality of candidate color transforms further comprises:

receiving motion data indicating detected motion in each of the plurality of static areas in the scene as depicted in the first image, and upon the detected motion exceeding a threshold motion value for a static area of the plurality of static areas, disregarding said static area when determining the plurality of candidate color transforms.

6. The method of claim 1, wherein the step of determining a plurality of static areas in the scene comprises at least one of:

for each image, determining a luminosity value of natural light in the scene as depicted by the image, and associating each of the static areas with the image having the highest luminosity value; or for each image, determining a Color Rendering Index (CRI) of light in the scene as depicted by the image, and associating each of the static areas with the image having the highest CRI.

7. The method of claim 1, wherein the step of determining a plurality of static areas in the scene comprises, for each static area in the scene, at least one of:

for each image, determining a luminosity value of natural light in the static area in the scene as depicted by the image, and associating the static area with the image of the plurality of images having the highest determined luminosity value for the static area; or for each image, determining a Color Rendering Index (CRI) of light in the static area in the scene as depicted by the image, and associating the static area with the image having the highest CRI for the static area.

8. The method of claim 1, wherein the step of determining a plurality of static areas in the scene comprises:

receiving motion data indicating detected motion in each image and determining the plurality of static areas in the scene based on the received motion data.

9. The method of claim 1, wherein the step of determining a plurality of static areas in the scene comprises:

for each area in the scene, determining a similarity measure between image data depicting the area in the plurality of images, upon the similarity measure exceeding a threshold similarity measure, including the area among the plurality of static areas.

10. The method of claim 1, wherein the step of determining a plurality of static areas in the scene is performed repeatably with a regular interval, each time using a new set of images.

11. A non-transitory computer-readable storage medium having stored thereon instructions for implementing a method when executed on a device having processing capabilities, the method comprising the steps of:

from a plurality of images depicting a scene, determining a plurality of static areas in the scene, wherein each static area of the plurality of static areas is associated with an image from the plurality of images;

obtaining a first image depicting the scene comprising an object;

determining a plurality of candidate color transforms by, for at least some of the plurality of static areas:

determining a color transform based on a comparison between first pixel data from the associated image and second pixel data from the first image, said first pixel data depicting the static area in the associated image, and said second pixel data depicting the static area in the first image;

determining a plurality of candidate color values of the object by applying each of the plurality of candidate color transforms to third pixel data from the first image, said third pixel data depicting the object in the first image;

associating the plurality of candidate color values to the object;

searching, in a forensic search application, using a search request comprising a first color value as a search criterion; and upon determining that the first color value matches one or more candidate color values of the plurality of candidate color values associated with the object, returning a search response including information about the object.

12. A system comprising a color matching component and a forensic search application, wherein the color matching component comprises:

one or more processors; and one or more non-transitory computer-readable media storing first computer executable instructions that, when executed by the one or more processors, cause the color matching component to perform actions comprising:

from a plurality of images depicting a scene, determining a plurality of static areas in the scene, wherein each static area is associated with an image from the plurality of images;

obtaining a first image depicting the scene comprising an object;

determining a plurality of candidate color transforms by, for each static area of at least some of the plurality of static areas:

determining a color transform based on a comparison between first pixel data from the associated image and second pixel data from the first image, said first pixel data depicting the static area in the associated image, and said second pixel data depicting the static area in the first image;

determining a plurality of candidate color values of the object by applying each of the plurality of candidate color transforms to third pixel data from the first image, said third pixel data depicting the object in the first image;

associating the plurality of candidate color values to the object;

receiving a search request comprising a first color value as a search criterion; and upon determining that the first color value matches one or more of the plurality of candidate color values associated with the object, returning a search response including information about the object;

wherein the forensic search application comprises:

one or more processors; and one or more non-transitory computer-readable media storing second computer executable instructions that, when executed by the one or more processors, cause the forensic search application to perform actions comprising:

providing the search request comprising the first color value as a search criterion to the color matching component;

receiving a search response from the color matching component including information about the object; and displaying the information about the object to a user.

13. The system according to claim 12, wherein the first computer executable instructions further cause the color matching component to perform actions comprising:

for each candidate color value, determining a confidence score indicating a probability that the candidate color value equals a color of the object in the scene as observed in natural daylight, wherein the confidence score is based at least in part on at least one of:

a spatial distance from the object in the scene to a static area among the plurality of static areas in the scene, wherein said static area being involved when determining the candidate color value, wherein a comparably shorter distance results in a comparably higher confidence score;

a comparison of a distance between the object in the scene to a camera capturing the first image and a distance between a static area among the plurality of static areas in the scene and the camera, wherein said static area is involved when determining the candidate color value, wherein a comparably similar distance results in a comparably higher confidence score;

clustering the plurality of candidate color values, wherein the candidate color value being part of a comparably larger cluster results in a comparably higher confidence score;

wherein the search response comprises the confidence score determined for the candidate color value matching the first color value of the search request.

14. The system according to claim 12, wherein the first computer executable instructions further cause the color matching component to perform actions comprising:

receiving motion data indicating detected motion in each of the plurality of static areas in the scene as depicted in the first image; and upon the detected motion exceeding a threshold motion value for a static area of the plurality of static areas, disregarding said static area when determining the plurality of candidate color transforms.

15. The system according to claim 14, wherein the first computer executable instructions further cause the color matching component to perform actions comprising at least one of:

clustering the determined color transforms into a plurality of clusters, determining a representative color transform for each cluster and using the representative color transform as a candidate color transforms; or determining a plurality of representative color transforms from the determined color transforms using a Random Sample Consensus, RANSAC, algorithm and using the plurality of representative color transform as the plurality of candidate color transforms.

* * * * *